United States Patent Office 3,386,958
Patented June 4, 1968

3,386,958
PROCESS OF PREPARING POLY(METHYLENE SULFIDE)
Nathaniel L. Remes, Yonkers, N.Y., and Jesse C. H. Hwa, Stamford, Conn., assignors to Stauffer Chemical Company, New York, N.Y., a corporation of Delaware
No Drawing. Filed Nov. 15, 1965, Ser. No. 507,678
9 Claims. (Cl. 260—67)

ABSTRACT OF THE DISCLOSURE

Process of preparing poly(methylene sulfide) having recurring —$CH_2S$— units comprising reacting hydrogen sulfide with formaldehyde in the presence of a catalyst amount of an alkali metal or alkaline earth metal trithiocarbonate.

---

This invention relates to a process of preparing poly(methylene sulfide). The invention also relates to modified poly(methylene sulfide) of enhanced thermal properties and a process of preparing the same.

Poly(methylene sulfide) is a known polymeric substance, the structure of which consists of recurring —$CH_2S$— units. It is desirably prepared by reacting formaldehyde with hydrogen sulfide since these are low cost, readily availablle industrial chemicals. Offsetting the attractive economic picture is the difficulty of operating the aforesaid process whereby there is obtained at practical reaction rates high yields of polymer having the requisite physical characteristics, i.e., high molecular weight, fiber forming properties, stability and the like.

With a view to effecting improvements in the poly(methylene sulfide) art, we have now discovered that the reaction of formaldehyde with hydrogen sulfide is advantageously carried out in the presence of salts of trithiocarbonic acid to furnish good yields of high quality poly(methylene sulfide). Although we do not wish to be bound by anything postulated hereinafter, the trithiocarbonate apparently functions as a catalyst since it is effective in relatively small amounts. It also has been found that the poly(methylene sulfide) obtained by the aforesaid process can be further improved by treating it with certain functional reagents described elsewhere herein, and this constitutes an additional aspect and advantage of the invention.

In practicing the invention, generally satisfactory results are achieved by contacting the formaldehyde with hydrogen sulfide in aqueous solution and in the presence of a salt of trithiocarbonic acid such as sodium trithiocarbonate. Polymerization begins almost immediately, and the speed and vigor thereof can be regulated by controlling the reaction conditions. It has been our finding that the preferred temperature range is between 70° C. and 95° C., although temperatures as high as 150° C. can be employed with appropriate pressurized vessels.

We have found that the quantity of trithiocarbonate used in the process of the present invention is not a particularly critical factor; a range of from about 0.01 to about 2.0 mole percent based on the formaldehyde is practical. The preferred quantity is in the neighborhood of about 0.6 mole percent based on the formaldehyde.

The polymerization can be effectively performed in water or in aqueous media composed of a solution of a relatively inert, normally liquid organic solvent. The solvent should have a substantial degree of water solubility. The use of dispersing agents may also be advantageous for reducing the viscosity of the reaction medium which tends to increase as the insoluble polymer is formed.

After reaction is complete, the insoluble precipitate of poly(methylene sulfide) is separated from the reaction mixture and the crude polymer treated with diluted mineral acid, e.g., 5–10% aqueous hydrochloric acid, until the acidity of the wash liquid has a pH of about 2. It is then separated from the acid, washed thoroughly with water and air dried. The product is a free-flowing powder generally melting above 220° C. as determined in a heated oil bath. Chemical analysis and physical properties suggest that the polymer is a linear polymer consisting of recurring —$CH_2S$— units.

Suitable salts which may serve as catalysts for the process described hereinabove include the alkali metal trithiocarbonates, e.g., lithiumtrithiocarbonate, sodium trithiocarbonate, potassium trithiocarbonate, etc., the alkaline earth trithiocarbonates, e.g., calcium trithiocarbonate, barium trithiocarbonate, strontium trithiocarbonate, magnesium trithiocarbonate, and the like.

It is to be understood that formaldehyde can be employed in either the anhydrous gaseous form or in an aqueous solution. A 36–38% aqueous solution is available under the trade name formalin. Another common source of formaldehyde is solid paraformaldehyde, a linear polymer of formaldehyde.

The poly(methylene sulfide) produced in accordance with the present invention may be modified by treating it with certain classes of chemical reagents. This results in a product which is superior with respect to thermal stability than the unmodified polymer. Apparently unaltered poly(methylene sulfide) contains thermally sensitive end groups and these are neutralized or rendered less reactive by treatment with the herein described reagents.

It has been found that polymer products of exceptional inertness and stability are obtained by reacting poly(methylene sulfide) with organic carboxylic acids or derivatives thereof such as acyl halides or anhydrides or a halohydrocarbon whereby the thermally sensitive end groups of the polymer chain are replaced by an acyl group or hydrocarbon residue. Although the exact mechanism is not known, it is believed the aforesaid transformations take place in accordance with the following schematic equations wherein it is assumed that the end group in the original polymer is a mercapto function.

Acylation of poly(methylene sulfide)

(1)
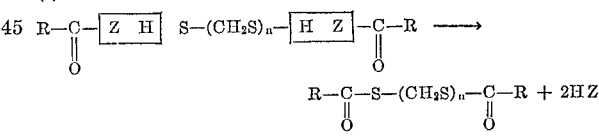
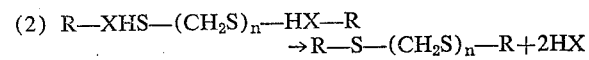

Alkylation of poly(methylene sulfide)

(2) R—XHS—$(CH_2S)_n$—HX—R
    →R—S—$(CH_2S)_n$—R+2HX wherein R is a hydrocarbon radical free of interfering substituents and having from 1 to 20 carbon atoms, X is a halogen such as chlorine, bromine or the like, and Z is a halogen as given for X or an organic acid radical —OOCR where R has the same definition as described before. It will be observed that reaction 1 results in poly(methylene sulfide) terminated by an acyl residue, whereas reaction 2 leads to a hydrocarbon terminated polymer. Typical hydrocarbon radicals contemplated for R include alkyl, e.g., methyl, ethyl, n-propyl, isobutyl, n-pentyl, isohexyl, n-decyl, dodecyl, tetradecyl, etc., aralkyl, e.g., benzyl phenethyl, etc., aryl, e.g., phenyl, biphenylyl, 2-naphthyl, —naphthyl, tolyl, etc., alkenyl, e.g., allyl, dodecenyl, etc.

Acylating agents suitable for practicing the invention include acetic anhydride, propionic anhydride, acetyl chloride, acetyl bromide, propionyl chloride, acrylyl chloride, methacrylyl chloride, valeryl chloride, heptanoyl chloride, tridecanoyl chloride, heptodecanoyl chloride, benzoyl cvhloride, benzoyl bromide, 2-naphthoyl chloride, phenylacetyl chloride and the like.

Suitable halohydrocarbons include alkyl halides, e.g., methy choride, methy bromide, methy iodide, ethyl iodide. n-propyl chloride, n-pentyl chloride, isohexyl bromide, n-octyl chloride, n-decyl bromide, tetradecyl bromide, etc., monohalogenated amoratic hydrocarbons, e.g., bromobenzene bromotoluene, 2-bromobiphenyl, 2-bromonaphthalene and the like.

As used herein, alkylation means the introduction of any hydrocarbon residue into the poly(methylene sulfide), e.g., alkyl, aryl, aralkyl, cycloalkyl and the like.

The modified poly(methylene sulfide) of the invention can be prepared by treating poly(methylene sulfide) with the appropriate reagent in the presence of a non-reactive diluent such as a hydrocarbon, an ether or an alcohol. In certain cases where the reagent is liquid, e.g., acetic anhydride, benzoyl chloride, etc., it may be used in sufficient excess to serve as a diluent.

The reaction to form modified poly(methylene sulfide) is carried out at temperatures of from about 20° C. to about 200° C. and is normally complete in about 30 minutes to 4 hours, depending on the chemical reactivity of the particular reagent. The modified poly(methylene sulfide) is separated from the reaction mixture by filtration or other convenient means known to the art, washed and dried.

The modified products of the invention are characterized by improved thermal stability as compared to unmodified poly(methylene sulfide) which has not been treated. The thermal stabilities are determined by heating a quantity of polymer at a temperature above its melting point for a fixed period of time. The ratio of the loss in weight ($W_1-W_2$) of the sample to the initial weight ($W_1$) multiplied by 100 indicates the percent degradation of the sample and is a measure of the thermal stability of the product.

$$\text{Percent degradation} = \frac{W_1 - W_2}{W_1} \times 100$$

The process herein engenders a polymer which can be milled, mixed and generally manipulated at temperatures above its melting point, under conditions which would normally cause extensive degradation in unmodified poly(methylene sulfide). Although the latter can be worked as a fine powder below its melting point, it is more advantageous to use a polymer in its molten state. For example, poly(methylene sulfide) cannot be conveniently and practically incorporated into a plastic substrate such as polypropylene unless it is milled at temperatures above its melting point.

In carrying out the chemical modification of poly(methylene sulfide) as above described, the principal result is an improvement in the thermal properties of the polymer due to tying up of the sensitive end groupings. It has also been discovered that by treating the unaltered poly(methylene sulfide) with the polyfunctional reagents of the above described class, it becomes possible to link or couple the polymer units, thereby forming a high molecular weight material. For instance, the initially prepared or unaltered poly(methylene sulfide) can be reacted with bifunctional acid chlorides or anhydrides whereby there is formed a polymeric chain consisting of a —$(CH_2S)$—$_n$ bridge interrupted with acyl units. Thus, the reaction product of phthalyl chloride and unaltered poly(methylene sulfide) could be depicted schematically as follows:

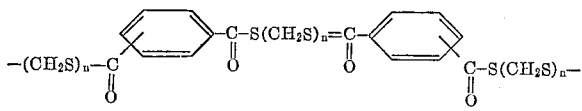

Other suitable polyfunctional reagents include p-quinone dioxime, divinyl compounds such as divinylsulfone, glycol diacrylate, etc., sulfur halides, e.g., $SO_2Cl_2$, $SOCl_2$, $S_2Cl_2$ and the like.

The modified poly(methylene sulfide) produced by the aforedescribed coupling reactions, in addition to possessing unusually high thermal stability, is also possessed of other desirable polymer characteristics such as good fiber forming, casting and extrusion properties.

Reference is now made to the following non-limiting examples which illustrate the nature of the present invention:

PREPARATION OF UNMODIFIED POLY(METHYLENE SULFIDE)

Example 1

A three-neck flask fitted with stirrer, thermometer, reflux condenser and gas inlet tube, is charged with 81 g. (1 mole) of 36% aqueous formaldehyde. With the gas tube beneath the surface of the liquid and at a temperature of 90–96° C., approximately 20 liters of hydrogen sulfide (26 g.) measured at ambient temperature, is passed through the stirred solution over a 20-minute period; no visible reaction is observed. Upon addition of three ml. of 24% aqueous sodium trithiocarbonate, the solution darkens, becomes slightly turbid, and upon the addition of hydrigen sulfide, solids precipitate. Ten more liters (13.3 g., 0.42 mole) of hydrogen sulfide is added and the mixture agitated for three hours. The precipitate is filtered. The pH of the filtrate is 5. The precipitate is then acidified with dilute hydrochloric acid to a pH of 2–3, refiltered and dried to yield 18 g. of poly(methylene sulfide) melting at 233°–237°C.; yield 98% based upon the hydrogen sulfide charged. The structure of the product is established by comparison of its infrared absorption spectrum with that of a specimen of poly(methylene sulfide) prepared by a prior art procedure disclosed in Lal, J. Org. Chem., 26, 971 (1961).

Example 2

A three-neck flask is equipped with stirrer, condenser, thermometer and gas inlet tube. The top of the condenser is vented through a wet test meter. The flask is charged with 82 g. of 36% formaldehyde solution and 150 ml. of water. The temperature is raised to 90° C., two ml. of 24 weight percent aqueous sodium trithiocarbonate solution added, and hydrogen sulfide introduced. Within two minutes, a turbid, white suspension developes in the flask. Hyrogen sulfide not absorbed is monitored by means of the wet test meter at 25° C. The course and progress of the reaction is summarized in the following table.

TABLE

| Time, Minutes | Reaction Temp., (° C.) | g. $H_2S$ Added | Ml. 24% $Na_2CS_3$ Added | Excess $H_2S$ Evolved (liters) | $H_2O$ Added (ml.) |
|---|---|---|---|---|---|
| 0 | 90 | 0 | 2 | 0 | 0 |
| 5 | 90 | 10 | 0 | 1.0 | 100 |
| 10 | 90 | 7 | 0 | 3.0 | 0 |
| 30 | 90 | 18 | 0 | 0 | 0 |
| 55 | 90 | 5 | 1.5 | 4.0 | 200 |
| 70 | 90 | 6 | 0 | 0.4 | 0 |
| Total Amount | | 46 | 3.5 | 8.4 | 300 |

The final pH of the solution is between 6 and 8. It was acidified to pH 2.3, filtered and dried under vacuum to yield 48 g. of poly(methylene sulfide). The infrared absorption spectrum of the product corresponded to that of a specimen of poly(methylene sulfide) prepared by the method of Lal, J. Org. Chem., 26, 971 (1961).

Example 3

Using the technique and procedure of Example 2, poly(methylene sulfide) is prepared from a solution of 405 g. of 37% aqueous formaldehyde and 12.5 g. of a commercial dispersant designated TAMOL 731.

The poly(methylene sulfide) formed during the reaction is washed with hydrochloric acid, then with deionized water and dried over phosphorus pentoxide. The product melts in the range 230°–235° C. and contains 26.29% carbon, 4.33% hydrogen, 68.96% sulfur and .001% ash by elemental analysis. This compares with the calculated values of: 26.06% carbon, 4.38% hydrogen, 69.56% sulfur, and 0.0% ash. The X-ray diffraction pattern of the product corresponds to that reported by Lal, J. Org. Chem., 26, 971 (1961).

Example 4

Using the apparatus and procedure of Example 2, the reaction flask is charged with 82 g. of 37% formalin solution and 150 ml. of ethylene glycol. A slow stream of hydrogen sulfide is introduced into the mixture, and it is heated to 80° C. over a period of 30 minutes. At 85° C., three ml. of 24% aqueous sodium trithiocarbonate solution are added. The addition of hydrogen sulfide is continued while stirring the mixture vigorously until the calculated amount of hydrogen sulfide has been absorbed. The mixture is worked up as in Example 3.

Example 5

The stoichiometry and apparatus of Example 4 are utilized except that 150 ml. of ethylene glycol dimethylether is substituted for the ethylene glycol of Example 4. The results are parallel to those obtained in the previous examples.

PREPARATION OF STABILIZED POLY(METHYLENE SULFIDE)

Example 6

A slurry of 23.0 g. of poly(methylene sulfide) (0.5 mole) in 75 ml. of acetic anhydride is heated gently with stirring for 15 minutes in a three-neck flask equipped with stirrer, condenser and thermometer. 8.0 g. of anhydrous sodium acetate (0.1 mole) is then added and the slurry heated for 4.5 hours under reflux at a temperature of about 117°–121° C. After cooling and filtering, the solid is slurried with 250 ml. of water for 15 minutes. It is filtered and the wash operation repeated three times. The weight of recovered solid is 19 g.

Example 7

A sample of 23 g. (0.5 mole) of poly(methylene sulfide) is heated with stirring under nitrogen in dimethylacetamide (ca. 100 ml.) at 100°–122° C. for 40 minutes. 4.0 g. of pyridine (0.05 mole) and 7.0 g. of benzoyl chloride (0.05 mole) is added and the mixture heated at 140°–145° C. for 5 hours. It is then cooled and filtered. The precipitate is slurried with deionized water and then neutralized with dilute hydrochloric acid. The product is dried under vacuum at 70° C. for 5 hours. The yield is 21.3 g. (93%); M.P. 204°–240° C.

Example 8

A mixture of 23.0 g. of poly(methylene sulfide), 1.5 g. of potassium hydroxide (85% assay) and 150 ml. of dimethylacetamide is charged to a three-neck flask equipped with a stirrer, thermometer (for measuring liquid temperature) and a variable take-off distillation head so that the reaction mixture could either be heated under reflux or distilled.

The reaction mixture is heated at 110° C. for approximately 30 minutes to drive off residual moisture. During this period the reaction mixture first turns pink and then light yellow. The reaction is permitted to cool to about 75° C. and 11.0 g. of chlorobenzene is added. It is then heated for 105 minutes at a progressive pot temperature of 80° to 120° C.

The mixture is filtered hot, and the precipitate washed with a solution prepared from 25 ml. of 6% hydrochloric acid in 250 ml. of water. The product is then washed twice by slurrying it with deionized water for 30 minutes and filtering. It is then dried to yield 16.5 g. of modified poly(methylene sulfide).

Example 9

A mixture of 23 g. of poly(methylene sulfide), 70.0 g. of benzoyl chloride and 4.0 g. of pyridine in 200 ml. of dimethylacetamide is heated for four hours in a flask equipped with stirrer, thermometer (to record pot temperature) and reflux condenser at a temperature of 140°–145° C. The product is washed with dilute hydrochloric acid and with water as in Example 8, to yield 93% of modified poly(methylene sulfide).

Example 10

A mixture of 11.5 g. of poly(methylene sulfide), 1.0 g. of solid potassium hydroxide (85% assay), and 100 ml. of dimethylacetamide is charged to a flask equipped with stirrer, thermometer and distillation head as described in Example 8. The mixture is heated to 130°–140° C. to distill residual water, cooled to about 120° C., and 12.0 g. of p-dibromobenzene added. The mixture is heated for 90 minutes at 120°–160° C., cooled, and purified as in Example 8 to product modified poly(methylene sulfide) in a 35% yield.

THERMAL STABILITY OF MODIFIED POLY(METHYLENE SULFIDE)

The thermal stability of the modified poly(methylene sulfide) polymer produced in accordance with the invention is evaluated by determining the loss in weight of a 2 g. sample after heating it in an open ampoule for 25 minutes in an oil bath at a temperature of 240° C. After heating, the tube is removed from the bath and carefully wiped to remove a small amount of sublimate which has collected inside the tube on the upper surface. Results are compared in Table 1 with the unmodified poly(methylene sulfide) as the control.

TABLE 1.—THERMAL STABILITY OF POLY(METHYLENE SULFIDE) (240° C.)

| Example No. | Treatment | Weight Loss Treated Sample, Percent | Weight Loss Untreated (Control), Percent |
|---|---|---|---|
| 6 | acetic anhydride plus sodium acetate. | 4 | 35 |
| 8 | chlorobenzene plus KOH in dimethylacetamide as solvent. | 12 | 17 |
| 9 | benzoyl chloride plus pyridine in dimethylacetamide as solvent. | 25 | 46 |
| 10 | p-dibromobenzene plus KOH in dimethylacetamide as solvent. | 14 | 23 |

Where the treating reagent is divinyl sulfone or a sulfone having at least one vinyl group attached to the sulfone, it is our belief that the terminal mercapto function of the unaltered poly(methylene sulfide) adds across the vinyl double bond, thereby giving rise to a modified polymer in which at least one —CH₂S— unit is connected to the beta position of an ethyl-sulfonyl group. The reaction is thought to proceed according to the following scheme:

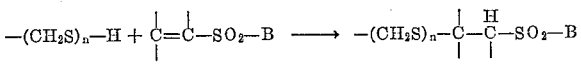

wherein B represents a hydrocarbon residue. In the event B is another vinyl group, the unaltered poly(methylene sulfide) can react at both ends of the sulfone reactant, in which case the resultant modified polymer consists of a chain, —CH₂S— units interrupted by a

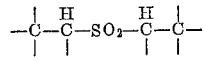

On the other hand, where B is an inert hydrocarbon substituent, then the —CH₂S— chain is merely terminated by a

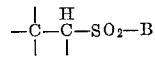

It is to be understood that the above given explanation to account for the reaction of unaltered poly(methylene sulfide) with such active reagents as a vinyl sulfone is given merely by way of hypothesis. We do not wish to be bound by any such explanation or theory.

All melting points listed herein were determined by the capillary method.

We claim:

1. A process of preparing poly(methylene sulfide) having recurring —$CH_2S$— units comprising reacting hydrogen sulfide with formaldehyde in the presence of a catalytic amount of substantially water-soluble metal trithiocarbonate selected from the group consisting of alkali metal and alkaline earth metal trithiocarbonates and recovering the so-formed poly(methylene sulfide).

2. The process of claim 1 wherein the metal trithiocarbonate is selected from the class consisting of alkali metal triothiocarbonates and alkaline earth metal trithiocarbonates.

3. The process of claims 1 and 2 wherein the metal trithiocarbonate is sodium trithiocarbonate.

4. The process of claim 1 wherein the source of formaldehyde is formalin.

5. The process of claim 1 wherein the source of formaldehyde is paraformaldehyde.

6. The process of claim 1 wherein the poly(methylene sulfide) is treated with a dilute acid after isolation.

7. The process of claim 1 wherein the reaction is carried out in an aqueous medium.

8. The process of claim 7 wherein the aqueous medium is a mixture of water and a relatively inert, normally liquid organic solvent having a substantial degree of water solubility.

9. The process of claim 1 wherein the process is carried out under moderately elevated temperatures.

References Cited
UNITED STATES PATENTS

| | | | |
|---|---|---|---|
| 3,284,411 | 11/1966 | Martin et al. | 260—67 |
| 3,300,445 | 1/1967 | Sidi | 260—67 |

WILLIAM H. SHORT, *Primary Examiner.*

L. M. PHYNES, *Assistant Examiner.*